UNITED STATES PATENT OFFICE.

EDWARD C. SPURGE, OF NIAGARA FALLS, NEW YORK, ASSIGNOR TO OZONE VANILLIN COMPANY, A CORPORATION OF NEW YORK.

PROCESS OF MAKING VANILLIN, &c.

No. 829,300.   Specification of Letters Patent.   Patented Aug. 21, 1906.

Application filed November 21, 1905. Serial No. 288,373.

*To all whom it may concern:*

Be it known that I, EDWARD CHARLES SPURGE, a subject of the King of England, residing in Niagara Falls, New York, have invented new and useful Improvements in Processes of Obtaining Vanillin and Similar Bodies; and in order that others skilled in the art to which my invention belongs may understand and practice the same I give the following specification.

My invention relates to a process for obtaining vanillin and similarly-constituted substances from carbon compounds which are characterized by a benzene nucleus with a lateral chain, $(C_3H_5.)$ Such carbon compounds may have a lateral chain either in the form $CH=CH-CH_3$ or its isomer $CH=CH-CH_2$. The carbon compound to which I particularly refer is isoeugenol. Heretofore it has been proposed to treat such compounds suspended in water or in the form of a solution with ozone or ozonized air, which by its reaction upon the compound converts the same into the corresponding aldeyhde—as, for instance, by the treatment of isoeugenol in the manner stated the aldehyde vanillin is produced. It has been found in practice that this process results in a considerable waste of material and a relatively small yield of the vanillin, and, further, that relatively large masses of material are required to be handled to obtain a relatively small proportion of the aldehyde.

I have discovered that the relatively low yield and other unfavorable results obtained by the above process, particularly in the case of vanillin, are due in large measure to the formation and presence of a resinous body of unknown composition which is produced in the reaction. This resinous body causes a thickening of the reaction mass and the aldehyde formed coagulates or agglomerates therein until as the reaction progresses this thickening and agglomeration reaches a point where the oxidizing action is seriously interfered with and impaired and the further production of vanillin materially diminished.

It is the object of the invention to provide means for preventing the thickening and agglomeration referred to and to maintain the reaction mass in a relatively thin fluid condition and most favorable to the thorough oxidation of the carbon compound.

I have discovered that if certain salts be added to the fluid to be treated the production of the resinous body is very considerably diminished, the thickening of the mass prevented, and a more fluid condition thereof is maintained which is favorable to the oxidation process and the obtaining of increased yield. For this purpose a bisulfite salt may be added in the form of a solution and the mass treated with ozone.

The vanillin formed combines with the bisulfite, either wholly or partially with the formation of a bisulfite compound which goes into solution either wholly or partially, according to the quantity of bisulfite employed. That portion which forms the bisulfite compound is less thick and more fluid and acts in the manner of an emulsifying medium. During the reaction there is liberated an amount of $SO_2$, and a certain amount of neutral sulfite and sulfate are formed. The latter, particularly the sulfate, being less soluble than the bisulfite are precipitated in a state of fine division during the oxidation process and being disseminated throughout the mass act favorably therein in keeping the same in a state of fine subdivision. It will be understood that during the oxidation process the ozonized air is blown through the reaction mass and the same is thereby kept in agitation. The bisulfite to be employed may be a bisulfite of an alkali. Preferably I employ bisulfite of soda.

For the purposes of illustration I give the following example of my invention as applied to isoeugenol: To one hundred pounds of isoeugenol are added three hundred pounds of sodium bisulfite of about 36° Baumé. The mass is charged into a suitable receiver to which is connected a supply of ozone or ozonized air, and the latter is passed through the mass for a length of time sufficient to carry the oxidation to the desired degree. The skilled operator will readily determine the degree of oxidation suited to the character of the product he desires, the character of the ozonized air—that is, its proportion of ozone, &c. These conditions vary in practice, and the skilled operator will determine the proper length of time required to complete the process. In the process illustrated the vanillin formed is recovered and separated from the mass in any of the well-known ways.

Other carbon compounds of the character described—for instance, iso-safrol and the like—may be treated according to my invention with good results.

Having thus described my invention, the following is what I claim as new therein and desire to secure by Letters Patent:

1. The process of oxidizing a carbon compound having a benzene nucleus with a lateral chain $C_3H_5$ to produce the corresponding aldehyde, which consists in treating said compound in admixture with a solution of an acid salt of sulfurous acid with ozone or ozonized air.

2. The process of oxidizing a carbon compound having a benzene nucleus with a lateral chain $C_3H_5$, to produce the corresponding aldehyde, which consists in treating said compound in admixture with a solution of an alkali bisulfite with ozone or ozonized air.

3. The process of producing vanillin, which consists in adding to a quantity of isoeugenol a proportion of bisulfite solution, and subjecting said mixture to the action of ozone or ozonized air.

4. The process of producing vanillin, which consists in adding to a quantity of isoeugenol a proportion of a solution of sodium bisulfite of about 36° Baumé and treating the mixture with ozone or ozonized air

EDWARD C. SPURGE.

Witnesses:
WILLIAM P. HAMMOND,
H. C. WORKMAN.